US011300170B2

(12) United States Patent
Bach et al.

(10) Patent No.: US 11,300,170 B2
(45) Date of Patent: Apr. 12, 2022

(54) SPREADER UNIT FOR A DRUM BRAKE, COMPRISING WEAR TRAVEL ADJUSTMENT, AND THE DRUM BRAKE

(71) Applicant: Continental Teves AG & Co. oHG, Frankfurt am Main (DE)

(72) Inventors: Uwe Bach, Frankfurt am Main (DE); Martin Gädke, Frankfurt am Main (DE); Holger von Hayn, Frankfurt am Main (DE); Ahmed Sefo, Frankfurt am Main (DE); Jens Hoffmann, Frankfurt am Main (DE); Adrian Messner, Frankfurt am Main (DE); Wolfgang Ritter, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 73 days.

(21) Appl. No.: 16/754,272

(22) PCT Filed: Oct. 8, 2018

(86) PCT No.: PCT/EP2018/077334
§ 371 (c)(1),
(2) Date: Apr. 7, 2020

(87) PCT Pub. No.: WO2019/072768
PCT Pub. Date: Apr. 18, 2019

(65) Prior Publication Data
US 2021/0190159 A1    Jun. 24, 2021

(30) Foreign Application Priority Data
Oct. 12, 2017 (DE) ................ 10 2017 218 219.9

(51) Int. Cl.
*F16D 65/56* (2006.01)
*F16D 51/22* (2006.01)
(Continued)

(52) U.S. Cl.
CPC .......... *F16D 65/562* (2013.01); *F16D 51/22* (2013.01); *F16D 65/22* (2013.01); *F16D 2121/24* (2013.01); *F16D 2125/36* (2013.01)

(58) Field of Classification Search
CPC ...... F16D 2125/30; F16D 65/22; F16D 51/22; F16D 65/08; F16D 2125/28; F16D 51/50;
(Continued)

(56) References Cited

U.S. PATENT DOCUMENTS 2,100,488 A * 11/1937 Rasmussen ........... F16D 65/561
188/79.62
2,130,875 A *  9/1938 Colman ................ F16D 65/561
188/79.52
(Continued)

FOREIGN PATENT DOCUMENTS

CN         1409804 A      4/2003
CN       105190076 A     12/2015
(Continued)

OTHER PUBLICATIONS

German Search Report for German Application No. 10 2017 218 219.9, with partial translaton, dated Jul. 3, 2018, 8 pages.
(Continued)

*Primary Examiner* — Robert A. Siconolfi
*Assistant Examiner* — Mahbubur Rashid
(74) *Attorney, Agent, or Firm* — RatnerPrestia

(57) ABSTRACT

An improved electromechanically drivable spreader unit having an integrated adjustment apparatus for a drum brake, in which the linear motion of brake shoe holders is produced by two ball-ramp devices, wherein a first ball-ramp device includes a first actuation piston arranged for rotation about the axis and a second ball-ramp device includes a second actuation piston arranged for rotation about the axis, and wherein an adjustment apparatus for compensating an actua-
(Continued)

tion travel that increases as a result of wear on the friction linings is arranged in an axially centered position within the housing and substantially between the actuation pistons.

10 Claims, 5 Drawing Sheets

(51) Int. Cl.
*F16D 65/22* (2006.01)
*F16D 121/24* (2012.01)
*F16D 125/36* (2012.01)

(58) Field of Classification Search
CPC .......... F16D 51/00; F16D 51/48; F16D 55/46;
F16D 65/44; F16D 65/46; F16D 65/546;
F16D 2127/08; F16D 51/04; F16D 51/12;
F16D 51/46; F16D 65/10; F16D 65/54;
F16D 65/561; F16D 65/60; F16D 65/563
See application file for complete search history.

(56) References Cited

U.S. PATENT DOCUMENTS

| | | | | | |
|---|---|---|---|---|---|
| 2,741,338 | A * | 4/1956 | Taylor | | F16D 65/546 188/196 B |
| 3,338,341 | A * | 8/1967 | Benjamin | | F16D 65/22 188/343 |
| 3,680,664 | A * | 8/1972 | Farr | | F16D 65/563 188/79.64 |
| 3,744,595 | A * | 7/1973 | Adams | | F16D 65/46 188/79.64 |
| 3,750,853 | A * | 8/1973 | Farr | | F16D 65/14 188/196 R |
| 3,811,538 | A * | 5/1974 | Farr | | F16D 65/22 188/79.62 |
| 3,838,757 | A * | 10/1974 | Farr | | F16D 65/561 188/79.62 |
| 3,874,483 | A * | 4/1975 | Farr | | F16D 65/22 188/196 BA |
| 3,935,929 | A * | 2/1976 | Wright | | F16D 65/09 188/331 |
| 3,977,500 | A * | 8/1976 | Farr | | F16D 51/20 188/106 A |
| 3,999,636 | A * | 12/1976 | Schumacher | | F16D 51/24 188/79.56 |
| 4,071,123 | A * | 1/1978 | Courbot | | F16D 65/561 188/196 BA |
| 4,326,607 | A * | 4/1982 | Chuwman | | F16D 65/38 184/109 |
| 4,353,439 | A * | 10/1982 | Ritsema | | F16D 51/24 188/196 BA |
| 4,369,863 | A * | 1/1983 | Farr | | F16D 51/18 188/106 A |
| 4,611,691 | A * | 9/1986 | Gornall | | F16D 55/18 188/71.8 |
| 4,742,897 | A * | 5/1988 | Hiroshi | | F16D 65/561 188/106 A |
| 4,792,021 | A * | 12/1988 | Fukuzawa | | F16D 65/561 188/196 A |
| 4,850,459 | A * | 7/1989 | Johannesen | | B60T 13/741 188/156 |
| 4,986,394 | A * | 1/1991 | Taft | | F16D 65/22 188/217 |
| 5,246,091 | A * | 9/1993 | Brooks, Sr. | | F16D 65/22 188/196 D |
| 5,713,437 | A * | 2/1998 | Furukawa | | B60T 11/30 188/352 |
| 6,367,367 | B1 * | 4/2002 | Terada | | F16D 65/38 188/196 D |
| 6,454,057 | B2 * | 9/2002 | Furukawa | | F16D 51/10 188/79.51 |
| 6,691,838 | B2 | 2/2004 | Wang | | |
| 7,472,776 | B2 * | 1/2009 | Charmat | | F16D 51/20 188/196 BA |
| 10,138,967 | B2 | 11/2018 | Drewes et al. | | |
| 10,151,365 | B2 * | 12/2018 | Bach | | F16D 65/562 |
| 2006/0278477 | A1 * | 12/2006 | Balz | | F16D 51/48 188/156 |
| 2007/0151818 | A1 * | 7/2007 | Linhoff | | F16D 51/48 188/326 |
| 2010/0010719 | A1 * | 1/2010 | Bauer | | B60T 13/741 701/70 |
| 2017/0363164 | A1 * | 12/2017 | Bach | | F16D 65/22 |

FOREIGN PATENT DOCUMENTS

| | | | |
|---|---|---|---|
| CN | 106536960 A | 3/2017 | |
| DE | 102014226268 A1 | 6/2016 | |
| DE | 102014226270 A1 | 6/2016 | |
| EP | 2093450 A1 | 8/2009 | |
| FR | 2869661 A1 | 11/2005 | |
| GB | 1355339 | 6/1974 | |
| JP | 47003210 | 2/1972 | |
| JP | 2010249314 A | 11/2010 | |
| WO | WO-2015082205 A2 * | 6/2015 | ............ F16D 65/22 |

OTHER PUBLICATIONS

International Search Report and Written Opinion for International Application PCT/EP2018/077334, dated Feb. 14, 2019, 7 pages.
Chinese Office Action for Chinese Application No. 201880066298.2, dated Mar. 1, 2021 with partial translation, 10 pages.
Korean Notice to Submit Response for Korean Application No. 10-2020-7013479, dated Nov. 2, 2021 with translation, 9 pages.

\* cited by examiner

SPREADER UNIT FOR A DRUM BRAKE, COMPRISING WEAR TRAVEL ADJUSTMENT, AND THE DRUM BRAKE

CROSS REFERENCE TO RELATED APPLICATIONS

This application is the U.S. National Phase Application of PCT International Application No. PCT/EP2018/077334, filed Oct. 8, 2018, which claims priority to German Patent Application No. 10 2017 218 219.9, filed Oct. 12, 2017, the contents of such applications being incorporated by reference herein.

FIELD OF THE INVENTION

The invention relates to an electromechanically drivable spreader unit for a drum brake, comprising wear travel adjustment, and the associated drum brake.

BACKGROUND OF THE INVENTION

With the increasing degree of automation of ever more systems, modern vehicles are being driven electromechanically. There is therefore an obvious desire for the use of particularly simple and robust drum brakes as the electromechanically driven service brake. In the operation of known and widely distributed drum brakes, two pivotably supported brake shoes are spread apart by at least one spreader unit and, in the process, are pressed against the radial inner wall of a pot-shaped brake drum. The use of robust, low-maintenance and low-friction ball-ramp devices, referred to as "ball-in-ramp", as rotation-translation converters is likewise known.

In order to operate a drum brake safely, reliable wear travel compensation is required. However, known conventional adjustment apparatuses connected downstream of the spreader unit increase the assembly and service efforts for the drum brake, are subject to severe contamination by brake dust and restrict automated, electronically controlled operation of a brake considerably.

Another disadvantage of ball-ramp devices is a relatively short stroke inherent in the design, which in itself is not sufficient to enable service-related wear of the brake shoes of a drum brake to be compensated. Moreover, the response time of the brake is increased in the case of a stroke enlarged due to wear.

Another disadvantage is the behavior of a ball-ramp device in the case of "hot parking"—parking with a brake drum that has become hot during operation and which shrinks when it cools. Because a ball-ramp device is rigid, this can cause an impermissible increase in forces on the internal brake components and hence damage. In the case of conventional drum brakes, there is a known practice of using a brake cable of sufficient length for the actuation of the brake shoes for a parking brake and compensating the shrinkage of the brake drum by means of the elasticity of said cable. However, a cable drive of this kind reduces the stiffness and speed of response of the brake and limits the maximum achievable braking force to the tensile strength of the cable, and therefore use as a service brake is at least limited or even impossible.

SUMMARY OF THE INVENTION

One aspect is an improved spreader unit for a drum brake by means of which robust and reliable wear travel adjustment can be achieved in all operating states while maintaining response times that are as short as possible, which can be actuated by an electronically controlled electromechanical drive and which, furthermore, is as compact and dirt-resistant as possible.

In particular, an aspect of the invention envisages that the linear motion of brake shoe holders is produced by two ball-ramp devices, wherein a first ball-ramp device comprises a first actuation piston arranged for rotation about a central axis and a second ball-ramp device comprises a second actuation piston arranged for rotation about the same axis, and an adjustment apparatus for compensating the wear travel is arranged in an axially centered position and within the housing of the spreader unit substantially between the two actuation pistons.

By means of such highly integrated functional integration, a compact, robust, dirt-resistant, easily assembled and versatile spreader module can be produced with just a few components. Because almost all the components are accommodated in a well protected manner in a common housing, many components can be produced at low cost from plastic. This enables a drum brake to be preassembled in components and offered in a modular construction and combined in a flexible manner, which allows improved handling on the production line with simplified logistics, and the balls of the ball-ramp devices are held in their installation position.

According to a development of an aspect of the invention, the actuation pistons are arranged in an axially floating manner in a driving sleeve and are secured against the latter against rotation, wherein the driving sleeve is mounted in the housing for rotation about the central axis and is provided with torque by an electromechanical drive unit, preferably via external toothing. Because separate axial compensation is irrelevant here, helical toothing, which runs significantly more quietly, can be used on the drive side instead of straight toothing.

An aspect of the invention furthermore envisages that the adjustment apparatus comprises an adjustment piston, which is in the same force transmission path as the first actuation piston, and a latching sleeve, which is in engagement with the adjustment piston via axial toothed rings. In this case, the latching sleeve is secured against rotation relative to the second brake shoe holder, can be moved axially to a limited extent relative to the second actuation piston and, at the same time, is arranged under elastic preload against the adjustment piston.

It is thereby possible, with a simple overall construction of the drum brake, to make the wear travel adjustment fully automated and to utilize the advantages of the ball-ramp devices, such as high stiffness and force transmission as well as low frictional losses, in a particularly effective manner.

According to a preferred embodiment of an aspect of the invention, the toothed rings of the adjustment apparatus are embodied in a mutually corresponding manner on the same circumferential circle by substantially ramps, each oriented and inclined in one circumferential direction, rotation of the toothed rings relative to one another is blocked in one circumferential direction and produces an axially directed force in the opposite circumferential direction.

According to the preferred development, the second ball-ramp device comprises a spreader piston arranged in a manner secured against rotation relative to the second brake shoe holder. This spreader piston has a stem projecting in the direction of the first actuation piston, wherein the latching sleeve is arranged in a manner secured against rotation and guided in a manner which allows axial movement on this stem. The latching sleeve is preferably pressed against the adjustment piston by a compression spring, which is supported on the second actuation piston, within said piston. A high degree of compactness is thereby achieved and the overall length of the spreader unit is reduced.

A particularly advantageous embodiment envisages that the first actuation piston and the adjustment piston are connected to one another by means of a screw threaded joint coaxial with the central axis. Removal of the unit with the adjustment piston is thereby easily possible and, as a result, the adjustment apparatus can be reset in an ergonomically advantageous, simple manner when the brake shoes are changed during servicing, while maintaining high functional reliability and reduced susceptibility to faults.

According to a likewise preferred embodiment of the invention, each brake shoe holder is arranged so as to be axially movable in the direction of the respectively associated ball-ramp device, wherein an elastically compressible spring element is clamped therebetween. By means of the compression of the spring element, the shrinkage of the brake drum upon cooling can be compensated, and the spreader unit according to an aspect of the invention can be used without restriction as a parking brake without additional components. Moreover, different spreader piston units with different spring stiffnesses and interfaces on the brake shoe holders can be offered as preassembled subassemblies or modules for cost-effective creation of variants and flexible adaptability of the drum brake to different requirements.

According to another advantageous embodiment, the spreader unit according to an aspect of the invention can be mounted in the drum brake so as to float along the central axis, thereby achieving effective compensation of the nonuniform contact of the linings with the brake drum without additional component.

Moreover, an aspect of the invention claims a drum brake comprising at least one spreader unit according to an aspect of the invention. A spreader unit of this kind can be used particularly effectively in a simplex drum brake, although other types of drum brake can likewise be used.

BRIEF DESCRIPTION OF THE DRAWINGS

Further features, advantages, and potential applications of an aspect of the invention are derived from the following description of an exemplary embodiment according to the invention. In this connection.

DETAILED DESCRIPTION OF THE PREFERRED EMBODIMENTS

Because the fundamental manner of operation both of a drum brake and of a ball-ramp device is sufficiently well known, only those functional characteristics which are essential to an aspect of the invention will be explored below.

FIG. 1

Figure 1:
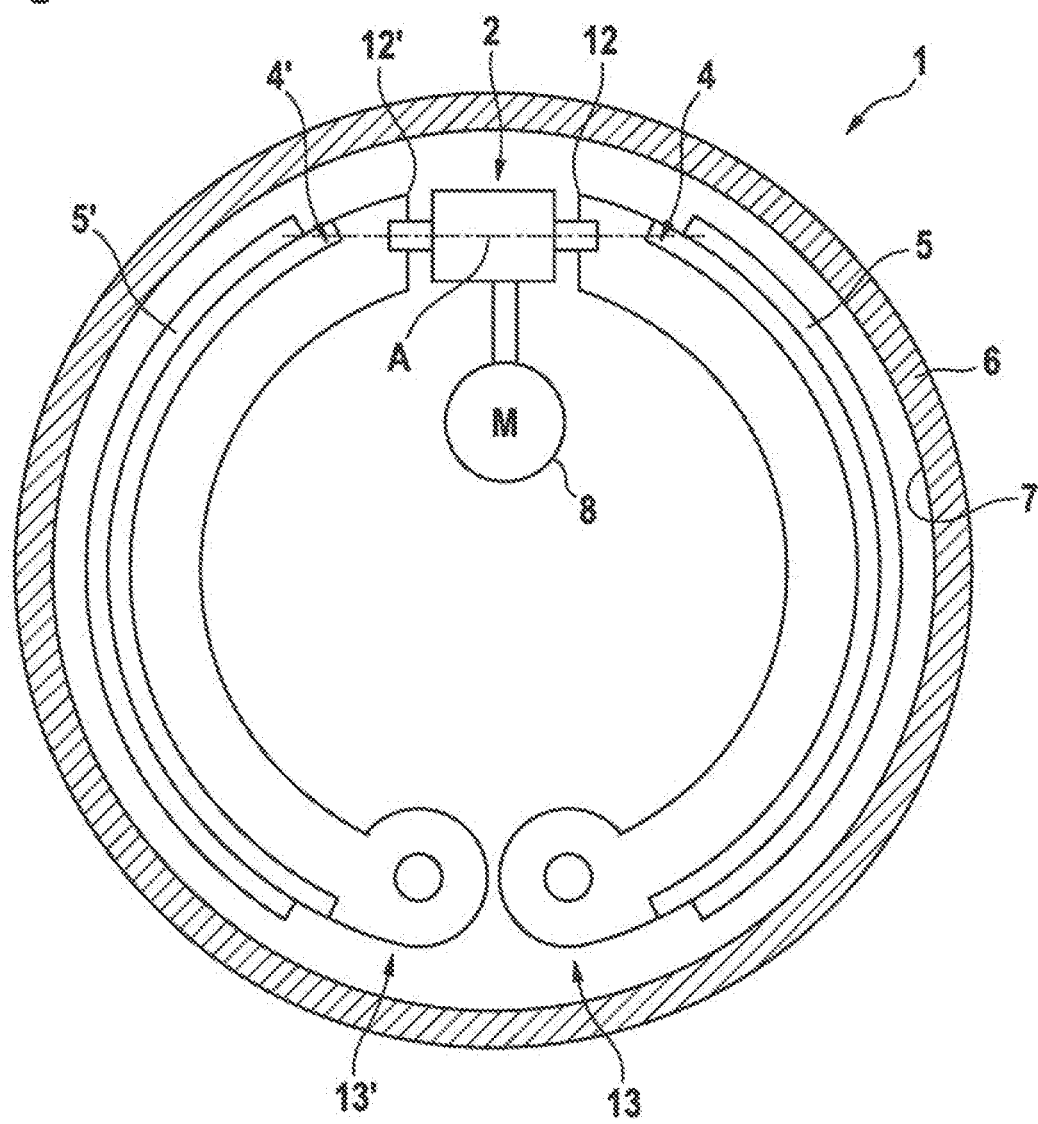
FIG. 1 shows a highly simplified sectional view into a drum brake of simplex design with a spreader unit according to an aspect of the invention.

FIG. 1 shows, by way of example and in a highly simplified form, a drum brake of the type in question of simplex design. Other known designs of drum brake can likewise be adapted within an aspect of the invention, however.

Two substantially circular-arc-shaped brake shoes 4, 4', supported pivotably at the first end 13, 13' thereof, are each spread apart at the second end 12, 12' thereof by a spreader unit 2 and, in the process, are pressed against the radially inner wall 7 of a pot-shaped brake drum 6. The brake drum 6 is connected to a vehicle wheel (not shown) and rotates together with the latter relative to the brake shoes 4, 4'. During this process, the brake linings 5, 5' attached to the brake shoes 4, 4' rub against the inner wall 7. Due to the wear of the brake linings 5, 5', the spreading travel required for a braking process increases continuously up to a defined wear limit.

In order to compensate any asymmetric, nonuniform contact between the linings 5, 5' and the brake drum 6, the spreader unit 2 is preferably arranged in such a way as to be mounted to float in the drum brake, preferably along the central axis A thereof.

FIG. 2

Figure 2:
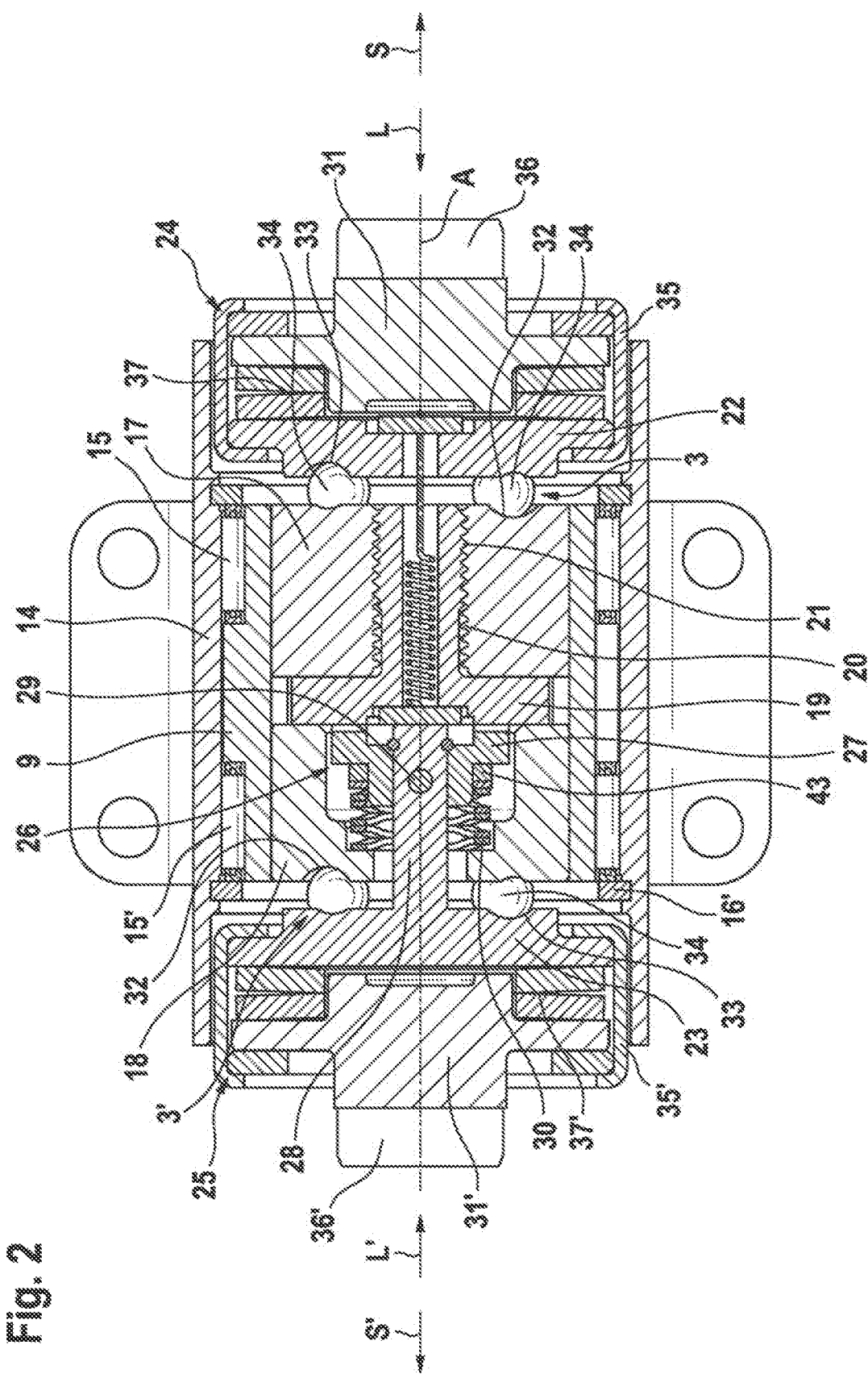
FIG. 2 shows an embodiment according to the invention of the spreader unit in axial section.

FIG. 2 shows an embodiment according to the invention of the spreader unit 2 in an unactuated initial state in axial section. The spreader unit 2 has two ball-ramp devices 3, 3', which act on the brake shoes 4, 4' via the brake shoe holders 31, 31'. For this purpose, each brake shoe holder 31, 31' has a transverse slot 36, 36', in each of which a flat end 12, 12' of a brake shoe 4, 4' is arranged. The spreader unit 2 furthermore has a substantially tubular housing 14 equipped with a mounting flange. The driving of the spreader unit 2 is performed by an electric-motor drive unit 8 indicated in FIG. 1 via the external toothing 10 of a driving sleeve 9, which is thereby rotated about the axis A and is supported in the housing 14 via rolling bearings 15, 15' and is fixed axially by retaining elements 16, 16'. Because the drum brake 1 according to an aspect of the invention is provided as a service brake, all the braking processes and not just a static, constant application of force during parking, for instance, are initiated via the driving sleeve 9. In the embodiment shown, the rolling bearings 15, 15' are designed as needle bearings, but other types of rolling bearing are likewise permissible within an aspect of the invention.

The braking process is performed via the ball-ramp devices 3, 3' on the brake shoe holders 31, 31' and the brake shoes 4, 4' in engagement therewith.

Each ball-ramp device 3, 3' essentially comprises a spreader piston 22, 23, an actuation piston 17, 18 rotatable about the axis A relative to the spreader piston 24, 25, and a multiplicity of balls 34. On their respectively facing ends, the first actuation piston 17 and the first spreader piston 22, and the second actuation piston 18 and the second spreader piston 23, each have an equal number of depressions 32, 33 on the same circumferential circle, said depressions being arranged in a manner distributed regularly in the circumferential direction. The depressions 32 in the actuation pistons 17, 18 are each designed to flatten out gradually in a first circumferential direction, the depressions 33 in the spreader pistons 22, 23 correspond to the depressions 22 but are flattened out in a second, opposite circumferential direction. A ball 34 is arranged between each depression 32 and 33. By virtue of the rotation of the actuation pistons 17, 18 relative to the spreader piston 22, 23 in an actuating direction, the balls 34 roll into the flattened-out regions of the depressions 32, 33 and push the piston pairs apart (and vice versa).

The two spreader pistons 22, 23 are secured against rotation in relation to the housing 14 and can thus only be moved linearly along the axis A. In the embodiment shown, the security against rotation is ensured by the support of the respective brake shoe holder 31, 31' on the brake shoe 4, 4' via the transverse slot 36, 36'. In this case, each brake shoe holder 31, 31' is connected in a manner secured against rotation to the respective associated spreader piston 22, 23 via an outer sleeve 35, 35' bent inward at the edges. In this case, each spreader piston 22, 23 is arranged spaced apart axially from the associated brake shoe holder 31, 31' within the outer sleeve 35, 35', with in each case a spring element 37, 37' preloaded therebetween. As a result, a limited linear motion in the axial direction is made possible and this ensures that, as the drum shrinks, the increase in clamping force is limited by the compression of the spring elements 37 in order to exclude damage to the brake. With the above-mentioned construction, a robust, easy-to-handle, pre-assemblable spreader piston unit 24, 25 is also created, said unit in each case essentially comprising a spreader piston 22, 23, a brake shoe holder 31, 31', a spring element 37, 37' and an outer sleeve 35, 35'.

Further solutions for providing security against rotation, which are not shown here, for spreader pistons 22, 23, e.g. by means of various axial guides relative to the housing 14, are likewise conceivable within an aspect of the invention.

The transmission of rotary motion required for the ball-ramp devices 3, 3' is performed by means of a first actuation piston 17 and a second actuation piston 18.

For the purpose of uniform contact between the brake linings 5, 5' and the inner wall 7, the two actuation pistons 17, 18 are arranged in the driving sleeve 9 in an axially floating manner and in a manner secured against rotation by means of axial guide 11. In the embodiment illustrated, the axial guide is formed by means of an axial toothing geometry, in particular axial splines. Further embodiments, e.g. projections engaging in axial grooves and the like are likewise permissible within an aspect of the invention.

An adjustment apparatus 26 essentially comprises an adjustment piston 19, which is in the same force transmission path as the first actuation piston 17, and a latching sleeve 27, which is in engagement with the adjustment piston 19 and is arranged in a manner secured against rotation relative to the second spreader piston 28 but in a manner which allows axial movement to a limited extent and under elastic preload against the adjustment piston.

A separate adjustment piston 19 is screwed into a threaded hole 20 in the first actuation piston 17 as far as a stop position by means of a threaded section 21 and thus lies in the force transmission path between the first actuation piston 17 and the second actuation piston 18. On its end facing the second actuation piston 18, the adjustment piston 19 has an axially projecting annular first toothed ring 38 having a plurality of tooth-shaped ramps 40 or notches sloping in one circumferential direction.

The latching sleeve 27 is arranged in a manner substantially integrated into the second actuation piston 18. It has an axially projecting annular second toothed ring 39, which corresponds to the first toothed ring 38 and which likewise consists of a plurality of tooth-shaped ramps 41 or notches sloping in an opposite circumferential direction.

The latching sleeve 27 is mounted in a manner which allows axial movement and in a manner secured against rotation in relation to the housing 14 on a stem 28 of the second spreader piston 23 by means of a central hole. In the embodiment shown, a transverse pin 29 is provided in the stem 28 to prevent rotation, the latching sleeve 27 being supported on said pin in both circumferential directions by means of an axially projecting slotted collar 42.

The latching sleeve 27 is pressed continuously with a slight force onto the toothed ring 38 of the adjustment piston 19 by a compression spring 30 supported on the second actuation piston 18. A sliding disk 43 reduces the friction and the rotation of the compression spring 30 when the second actuation piston 18 is rotated.

In the embodiment shown, the compression spring 30 is designed as a wave spring. Further embodiments, e.g. a spiral spring or a Belleville spring assembly, are likewise permissible within an aspect of the invention.

When the two actuation pistons 17 and 18 are driven by the driving sleeve 9, the adjustment piston 19 is rotated relative to the latching sleeve 27, which is immovable in the circumferential direction. During this process, the ramps 40 of the adjustment piston 19 run up onto the ramps 41 of the latching sleeve 27 during each actuation or braking operation and push them slightly into the second actuation piston 18, counter to the spring action of the compression spring 30. With increasing wear of the brake linings 5, 5', the required stroke and thus the angle of rotation of the driving sleeve 9 and of the adjustment piston 19 coupled thereto increases. As soon as the angle exceeds the circumferential length of a ramp 38 or 41, the axial toothing between the latching sleeve 27 and the adjustment piston 19 jumps into the next notch. If the brake is then released after a braking process, the first actuation piston 17 rotates back into the unactuated initial position together with the driving sleeve 9. However, the adjustment piston 19 is hindered from rotating back by the rotationally secured latching sleeve 27 and, as a result, is unscrewed by the corresponding amount from the first actuation piston 17. Thus, an adjustment process takes place fully automatically in steps under travel control during the release process of the drum brake 1.

Figure 3:
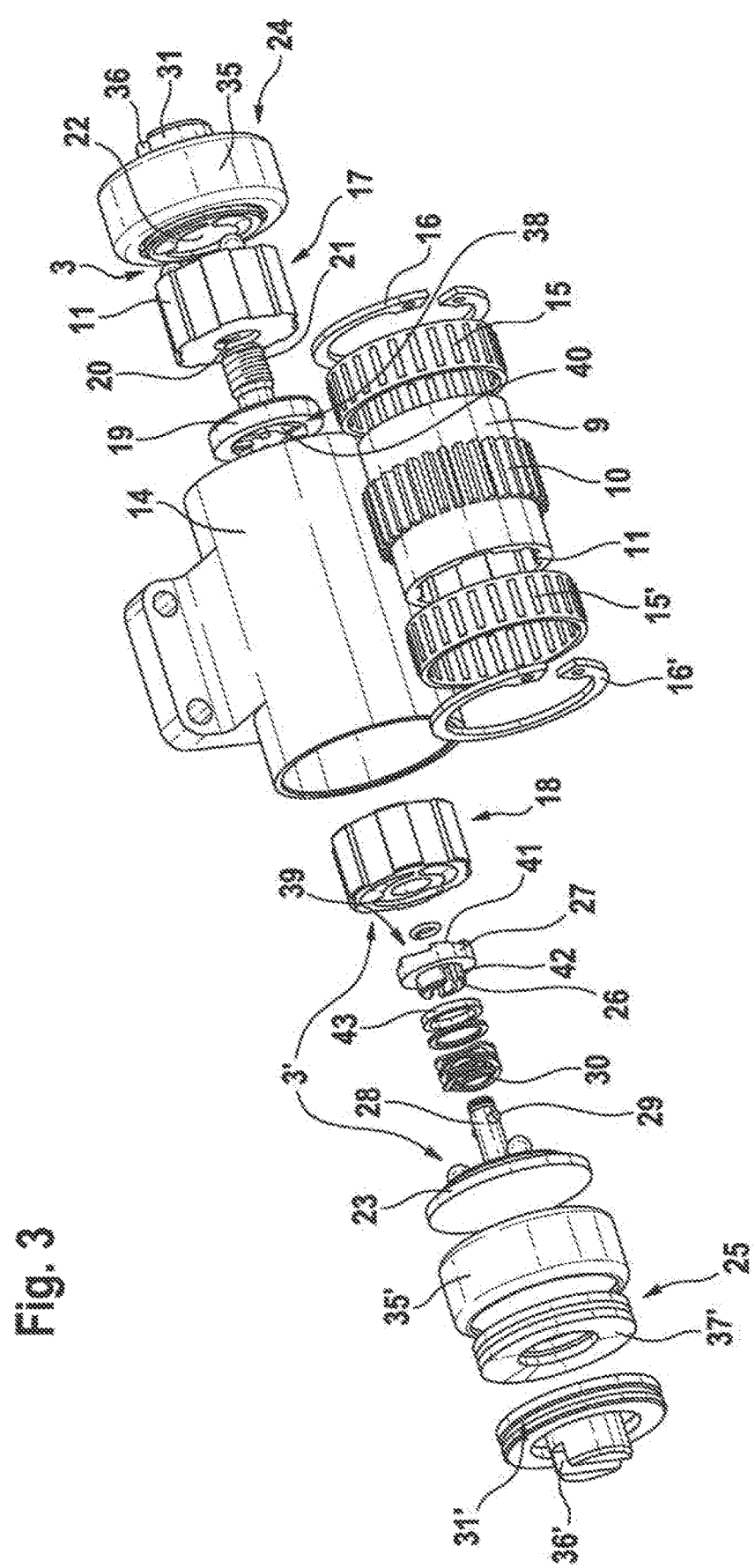
FIG. 3 shows the spreader unit according to FIG. 2 in a three-dimensional exploded illustration.
Figure 4:
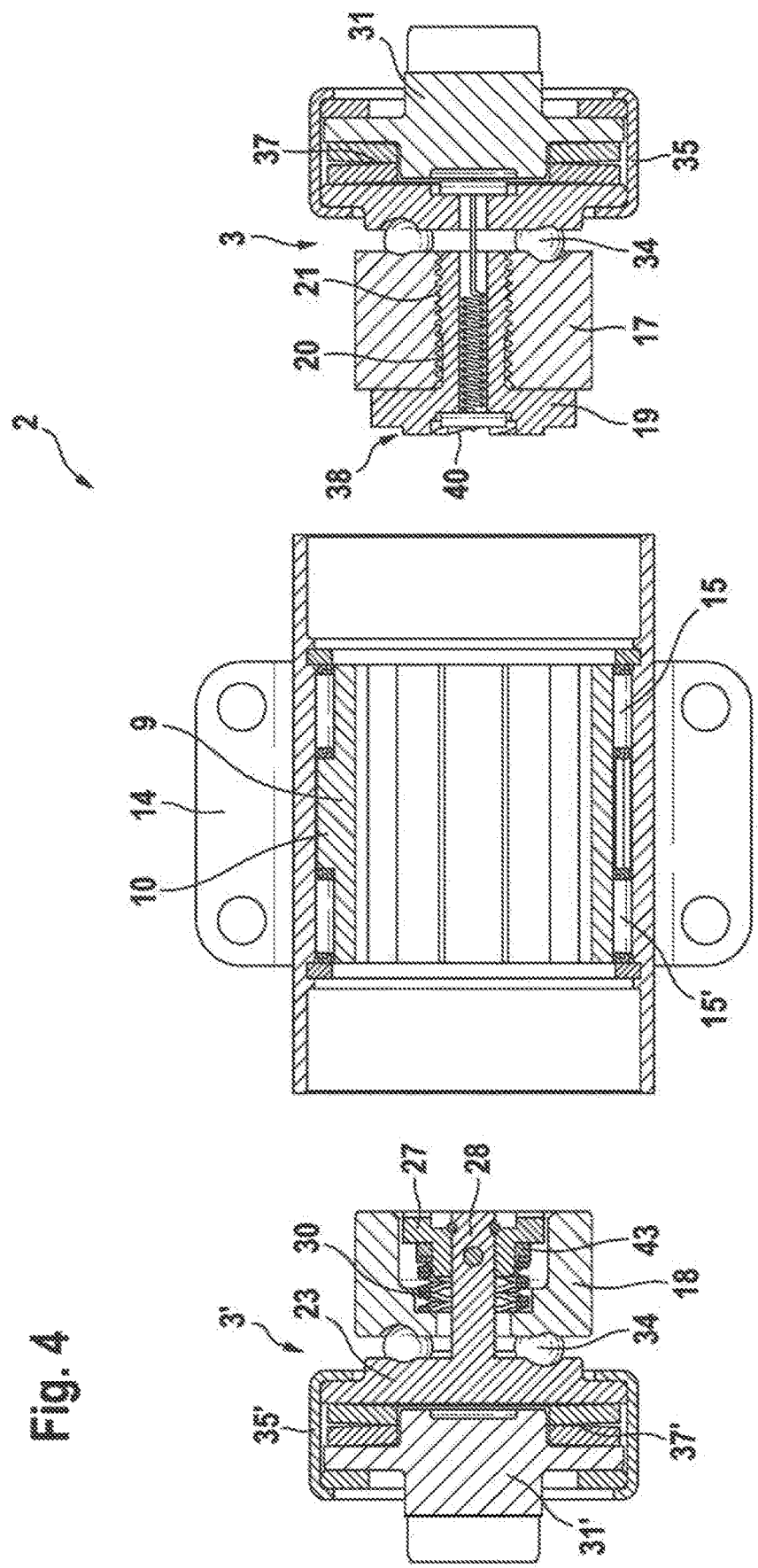
FIG. 4 shows a partially disassembled spreader unit according to FIG. 2 in axial section.
Figure 5:
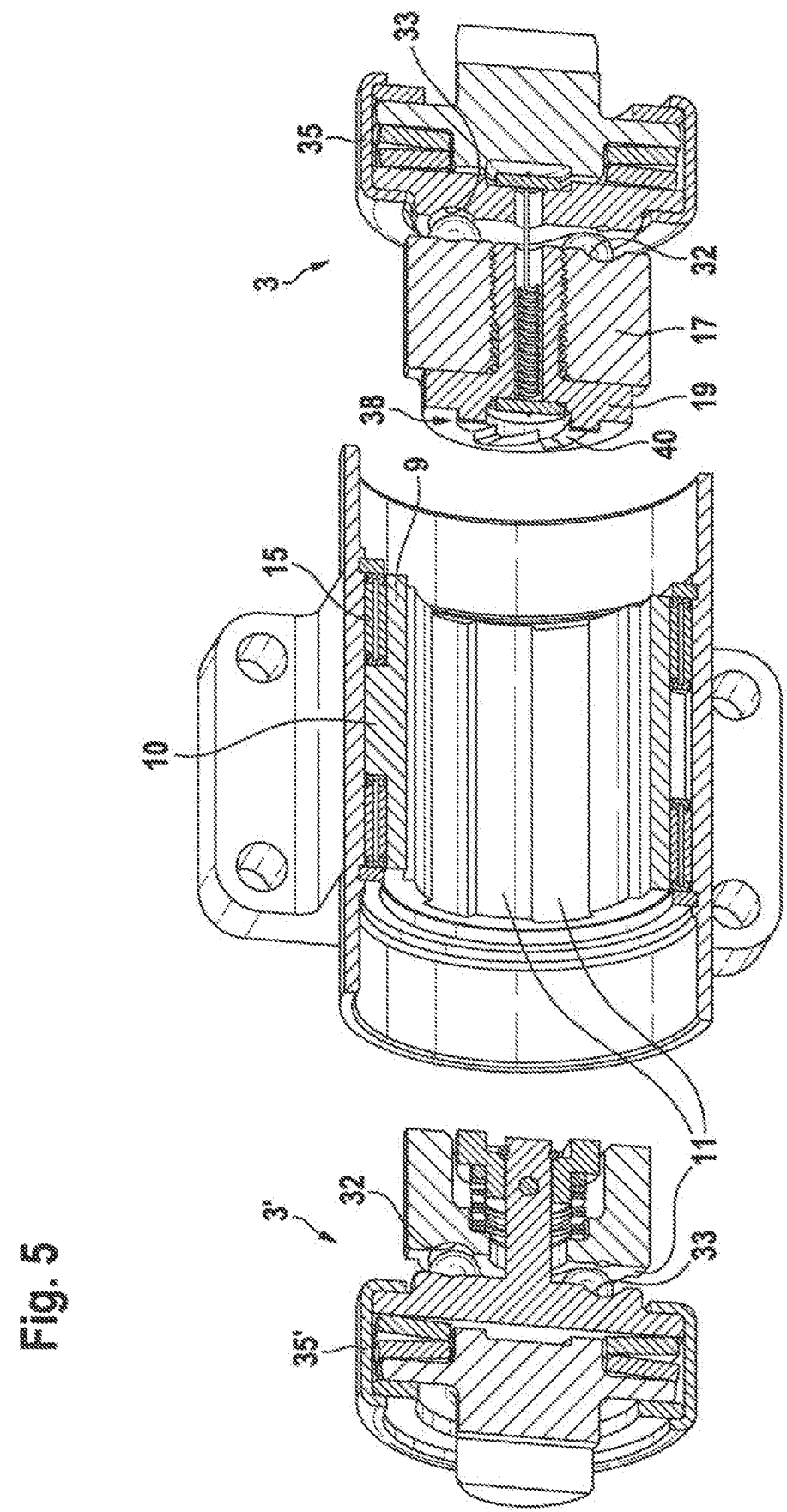
FIG. 5 shows a three-dimensional view of the illustration according to FIG. 4.

FIGS. 3 to 5 show the spreader unit 2 according to an aspect of the invention shown in FIG. 2 in further illustrations and views and serve to clarify the above presented facts and construction.

LIST OF REFERENCE SIGNS

1 Drum brake
2 Spreader unit
3 Ball-ramp device
4 Brake shoe
5 Brake lining
6 Brake drum
7 Inner wall
8 Drive unit
9 Driving sleeve
10 External toothing
11 Axial guide (axial toothing, splines)
12 End
13 End
14 Housing
15 Rolling bearing (needle bearing)
16 Retaining element
17 Actuation piston
18 Actuation piston
19 Adjustment piston
20 Threaded hole
21 Threaded section
22 Spreader piston
23 Spreader piston
24 Spreader piston unit
25 Spreader piston unit 26 Adjustment apparatus
27 Latching sleeve
28 Stem
29 Transverse pin
30 Compression spring
31 Brake shoe holder
32 Depression
33 Depression
34 Ball
35 Outer sleeve
36 Transverse slot
37 Spring element
38 Toothed ring
39 Toothed ring
40 Ramp
41 Ramp
42 Collar
43 Sliding disk
A Axis

The invention claimed is:

1. An electromechanically drivable spreader unit for a drum brake, comprising:
a housing and
two first and second brake shoe holders, which are arranged in a manner secured against rotation in relation to the housing and which can be actuated linearly along an axis, respectively away from one another in a spreading direction and toward one another in a release direction, and act respectively on a first and second brake shoe, each of which is provided with a brake lining,
wherein the linear motion of the brake shoe holders is produced by two ball-ramp devices,
wherein a first ball-ramp device comprises a first actuation piston arranged for rotation about the axis and a second ball-ramp device comprises a second actuation piston arranged for rotation about the axis,
wherein an adjustment apparatus for compensating an actuation travel that increases as a result of wear on the friction linings is arranged in an axially centered position and substantially between the actuation pistons within the housing,
wherein the actuation pistons are arranged in an axially floating manner in a driving sleeve and are secured against the latter against rotation, and
wherein the driving sleeve is provided with a torque by an electromechanical drive unit and is mounted in the housing for rotation about the axis.

2. The spreader unit as claimed in claim 1, wherein each brake shoe holder is axially movable in the direction of a respectively associated ball-ramp device, in the process compressing a spring element arranged under preload therebetween.

3. The spreader unit as claimed in claim 1, wherein the spreader unit is mounted in the drum brake so as to float along the axis.

4. An electromechanically drivable spreader unit for a drum brake, comprising:
a housing and
two first and second brake shoe holders, which are arranged in a manner secured against rotation in relation to the housing and which can be actuated linearly along an axis, respectively away from one another in a spreading direction and toward one another in a release direction, and act respectively on a first and second brake shoe, each of which is provided with a brake lining,
wherein the linear motion of the brake shoe holders is produced by two ball-ramp devices,
wherein a first ball-ramp device comprises a first actuation piston arranged for rotation about the axis and a second ball-ramp device comprises a second actuation piston arranged for rotation about the axis,
wherein an adjustment apparatus for compensating an actuation travel that increases as a result of wear on the friction linings is arranged in an axially centered position and substantially between the actuation pistons within the housing,
wherein the adjustment apparatus comprises an adjustment piston, which is in the same force transmission path as the first actuation piston, and a latching sleeve, which is in engagement with the adjustment piston via axial toothed rings, and
wherein the latching sleeve is secured against rotation relative to the second brake shoe holder, can be moved axially to a limited extent relative to the second actuation piston and is arranged under elastic preload against the adjustment piston.

5. The spreader unit as claimed in claim 4, wherein the toothed rings are formed in such a way, in a mutually corresponding manner, on a same circumferential circle by ramps oriented and inclined in a circumferential direction that rotation thereof relative to one another is blocked in one circumferential direction and brings about an axially directed force in an opposite circumferential direction.

6. The spreader unit as claimed in claim 4, wherein the second ball-ramp device comprises a spreader piston arranged in a manner secured against rotation relative to the second brake shoe holder, and
wherein the spreader piston has a stem projecting in the direction of the first actuation piston, and the latching sleeve is arranged in a manner secured against rotation and guided in a manner which allows axial movement on the stem.

7. The spreader unit as claimed in claim 4, wherein the latching sleeve is pressed against the adjustment piston by a compression spring, wherein the compression spring is supported on the second actuation piston.

8. The spreader unit as claimed in claim 4, wherein the first actuation piston and the adjustment piston are connected to one another by a screw threaded joint coaxial with the axis.

9. A drum brake comprising at least one spreader unit as claimed in claim 1.

10. A drum brake comprising at least one spreader unit as claimed in claim 4.

* * * * *